United States Patent [19]
Ryan et al.

[11] 4,354,243
[45] Oct. 12, 1982

[54] TWO DIMENSIONAL INTERPOLATION CIRCUIT FOR SPATIAL AND SHADING ERROR CORRECTOR SYSTEMS

[75] Inventors: John O. Ryan, Cupertino; Joseph L. Corkery, San Carlos, both of Calif.

[73] Assignee: Ampex Corporation, Redwood City, Calif.

[21] Appl. No.: 139,512

[22] Filed: Apr. 11, 1980

[51] Int. Cl.³ .................. G06F 15/353; H04N 5/38
[52] U.S. Cl. ............................ 364/515; 358/10; 358/163; 364/723
[58] Field of Search ................ 364/515, 577, 723; 358/8, 10, 37, 80, 139, 163, 166

[56] References Cited

U.S. PATENT DOCUMENTS

| | | | |
|---|---|---|---|
| 3,678,258 | 7/1972 | Patmore et al. | 364/723 X |
| 3,902,011 | 8/1975 | Pieters et al. | 358/163 |
| 4,158,208 | 6/1979 | Dischert | 358/10 |
| 4,234,890 | 11/1980 | Astle et al. | 358/10 |

Primary Examiner—Jerry Smith
Attorney, Agent, or Firm—George B. Almeida; Joel B. Talcott

[57] ABSTRACT

Data for providing spatial and shading error correction signals during the operating mode of a television camera, are taken from a two dimensional array of correction points distributed across a television image during the camera setup mode and are stored as 8 bit words. The error correction signals extend smoothly (linearly) between the correction points. The smoothing is performed by selectively interpolating selected reference points on each video line to provide values which vary smoothly from one row of correction points to the next. A vertical interpolation circuit performs a vertical interpolation on a line-by-line basis, by adding signals produced by a multiplying D/A converter when loaded with the two values to be interpolated and weighted by factors related to the distance from each correction point. The results of the vertical interpolation circuit are fed to a horizontal interpolation circuit which ramps linearly from one reference point to the next, to provide the spatial and shading error correction output signals.

23 Claims, 6 Drawing Figures

FIG_1

FIG_2

FIG_3A

FIG_3B

FIG. 4A

TWO DIMENSIONAL INTERPOLATION CIRCUIT FOR SPATIAL AND SHADING ERROR CORRECTOR SYSTEMS

CROSS REFERENCE TO RELATED APPLICATIONS

Digital Error Measuring Circuit for Shading and Registration Errors in Television Cameras, Ser. No. 139,604 filed Apr. 11, 1980, to K. H. Griesshaber.

A Total Raster Error Correction Apparatus and Method for The Automatic Setup of Television Cameras and the Like, Ser. No. 124,370, filed Feb. 25, 1980, to E. F. Morrison and T. E. Zank and now U.S. Pat. No. 4,285,004.

BACKGROUND OF THE INVENTION

The invention relates to the correction of errors in a television picture, and particularly to an error correction circuit which performs horizontal and vertical interpolation to provide error correction waveforms in a camera head during the camera operating mode.

Various systems are available for measuring selected errors in a television picture and for selectively storing the measured errors, during a camera setup mode. During the subsequent camera operating mode, the error correction waveforms corresponding to the measured errors are applied via an error correcting system located in the camera head, to various control inputs, scan deflectors, etc, to correct the given errors in the picture. Such systems utilize accordingly, an error measurement circuit generally removed from the camera head and which must be coupled, generally via cables, to the camera head to retrieve the stored error data during the camera operating mode.

Predominant among such correction schemes are those employing analog sources such as potentiometers, integrators, capacitors, etc., wherein the measured errors are encoded, multiplexed and decoded, thereby requiring considerable analog circuitry which in some systems, may generate considerable drift and thus stability problems. The analog sources must be read and continually re-adjusted, whereby the camera head, i.e., the correction circuit, is usually continually dependent upon the signals from the measurement circuit.

Recent improvements in error measurement and correction systems have included a remotely-located analog measurement circuit, which automatically generates error measurement signals during the setup mode and supplies the signals in digital form to a digital error correction circuit located in the camera head. The measured error data are measured by a differential sample value technique and are digitally stored in the camera head for subsequent use by the error correction circuit therein independently of the error measurement circuit, during the camera operating mode. During the camera operating mode, the correction circuit digitally reads out the differential data, performs an interpolation from correction point to correction point and converts the differential data to absolute values, generates analog error voltage waveforms which are superimposed on the basic deflection waveforms to correct, for example, horizontal and vertical spatial errors. Shading error correction signals are retrieved, converted to analog signals, and are fed to the video processing circuit to correct any shading errors.

Such an error correction circuit has the disadvantage of being generally complex in circuitry and lacking in the degree of accuracy which is presently desirable in spatial error measurement and corrector circuits.

Typical of the above prior art analog error measurement and digital error correction system is the system described in co-pending application to E. F. Morrison et al, Ser. No. 124,370 filed Feb. 25, 1980, and assigned to the same assignee as this application.

SUMMARY OF THE INVENTION

The invention overcomes the above-mentioned shortcomings of the prior art, by providing a simplified, highly accurate digital error correction circuit which digitally performs horizontal and vertical interpolation to produce video correction signals for spatial and shading corrections.

To this end, a vertical interpolator portion of the two-dimensional interpolator of description herein, receives two sets of words from a random access memory (RAM), which correspond to the correction data from a correction matrix row above a line presently being corrected, and the correction matrix row that is just below. The words from the two sets of data are interleaved, i.e., the successive words in the upper and lower rows are selectively mixed in a given order to provide an interleaved stream of data. The stream is fed to a multiplying D/A converter, along with a voltage waveform which is applied to the multiplying voltage input thereof. The voltage waveform is an interleaved combination of two voltage levels whose value is determined by the position of the line being corrected between the present upper and lower correction rows. The two voltages and the two data sets are interleaved in turn with selected phasing. Selected voltages of the resulting sequence are temporarily stored and added with other voltages of the sequence, to generate a vertical output sequence consisting of a weighted sum of the row above, and below, the line being corrected.

The vertical output sequence is fed to a horizontal interpolator portion. At a single summing junction thereof, the sums of the odd and even numbered values in the sequence from the vertical interpolator are added to the negative of the video correction output waveform, plus a DC offset voltage. The latter offsets the output waveform to provide a range of, for example, from $+2\frac{1}{2}$ to $-2\frac{1}{2}$ volts. The resulting voltage at the summing junction represents the difference between where the output waveform is, and where it should be by the end of the next correction. This difference voltage is selectively sampled and fed to an output integrator, which has a time constant corresponding to the correction interval. The integrator ramps from its existing voltage level, to that voltage plus the difference voltage. The resulting voltage is the video correction signal.

DESCRIPTION OF THE PREFERRED EMBODIMENTS

Figure 1:
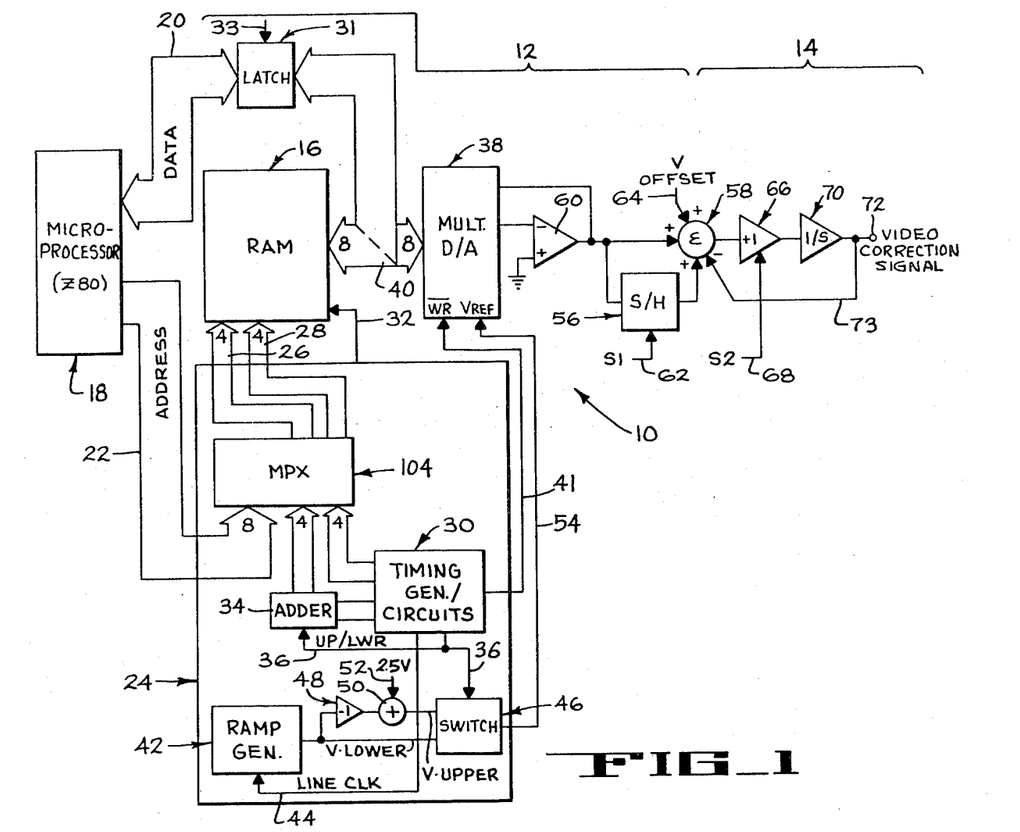
FIG. 1 is a block diagram of the invention interpolator circuit.

Referring to FIG. 1, the interpolator circuit 10 consists of a vertical (V) interpolator (portion) 12, and a horizontal (H) interpolator (portion) 14 coupled at its input to the output of the V interpolator 12, wherein the circuit 10 includes a random access memory (RAM) 16 for storing measured error data in the form of 8 bit words. The measured error data is received for storage from an error measurement circuit and a multiplexing system (not shown) of the camera system, via a microprocessor control system 18 and data and address input buses 20,22 respectively. An interface circuit 24 provides the required control logic timing/control signals, addresses, etc., between the interpolator circuit 10 and the associated microprocessor control system 18. Examples of error measurement, multiplexing and microprocessor control systems, and their relationship to a spatial/shading error corrector (SEC) circuit, are shown and described in the copending application to E. F. Morrison of previous mention. The interpolator circuit 10 of description herein defines, in essence, an SEC circuit portion of the above camera system combination.

Figure 2:
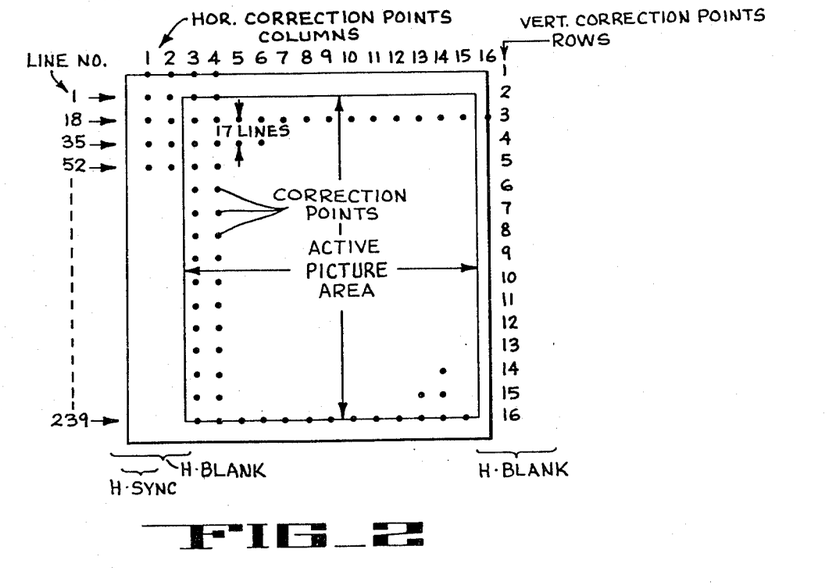
FIG. 2 is a plan of a television raster depicting a given array of correction points via which data is taken during the camera setup mode.

The interpolation circuit 10 provides video error correction signals for scan correction, i.e., horizontal and vertical spatial error correction, and black/white shading correction. The data used to generate the correction signals originates from a 16×16 array of correction points, which are distributed evenly in the horizontal and vertical directions across the television image, to provide a 13 by 14 array of correction points actually within the active picture, as depicted in FIG. 2. The actual waveform extends very smoothly (linearly) between these points. It is the function of this interpolator circuit 10 to accomplish this smoothing by performing highly accurate horizontal and vertical interpolation between correction points. The error data corresponding to the 182 correction points are provided via an error measurement circuit, of previous mention, which also employs a generally analogous sampling array of, for example, 13 by 14 blocks evenly distributed across the active television picture. Such an error measurement circuit is described, for example, in the copending application of cross reference above to K. H. Grisshaber, Ser. No. 139,604 filed Apr. 11, 1980, assigned to the same assignee as this application and incorporated herein by reference.

Along with the V and H correction data, pertinent V and H addresses are supplied via the associated interface circuit and particularly via a timing generator/circuit 30 under the microprocessor 18 control, and are loaded in the RAM 16 via V and H address buses 26, 28 respectively, along with the data. The data is supplied via a data latch 31 and H and V channel red (R), green (G) and blue (B) select commands on lines 33. The RAM is loaded in response to a write enable and RAM strobe on control lines 32 from the interface circuit timing generator/circuit 30. The V addresses are supplied via an adder 34, in response to an upper/lower row select command on a line 36.

The contents of the RAM 16 are read out in response to a read enable on the control lines 32, and are fed to a multiplying digital-to-analog (D/A) converter 38 via a multiplexed bus 40. The D/A 38 has a write control input thereto on a line 41.

A ramp generator 42 in the interface circuit 24, supplies a horizontal-rate voltage staircase in response to a line clock on a line 44 thereto. The staircase is supplied to a commutating switch 46 as a V-lower voltage, and also as a V upper voltage via an inverter 48 and a summing junction 50. The summing junction 50 receives a given DC voltage (eg, 2.5 volts) on input 52. The switch 46 provides for selecting the V lower or V upper inputs thereto in response to a 250 KHZ clock related to the upper/lower row select command on the line 36. The output of the switch 46 is fed to a reference, or multiplying, voltage input of the D/A converter 38 via a line 54.

The D/A converter 38 is coupled directly to a sample-and-hold (S/H) circuit 56 and to a resistive summing junction 58, and also is coupled thereto via the negative input of an amplifier 60. The positive input of amplifier 60 is tied to ground. The S/H circuit 56 is coupled to the summing junction 58, and is responsive to a sample-1 (51) pulse (250 KHZ) via a line 62. The summing junction also receives a V-offset voltage via a line 64. The output of the junction 58 is fed to an operational amplifier 66 which is sampled for a short interval (250 nanoseconds) via a sample-2 (52) pulse on a line 68. The amplifier 66 feeds an output integrator 70, whose output corresponds to the interpolation circuit 10 output 72, i.e., to the video correction signal which performs the spatial and shading error corrections. The output 72 is fed back as a negative waveform to the summing junction 58 via a line 73.

Figure 3A:
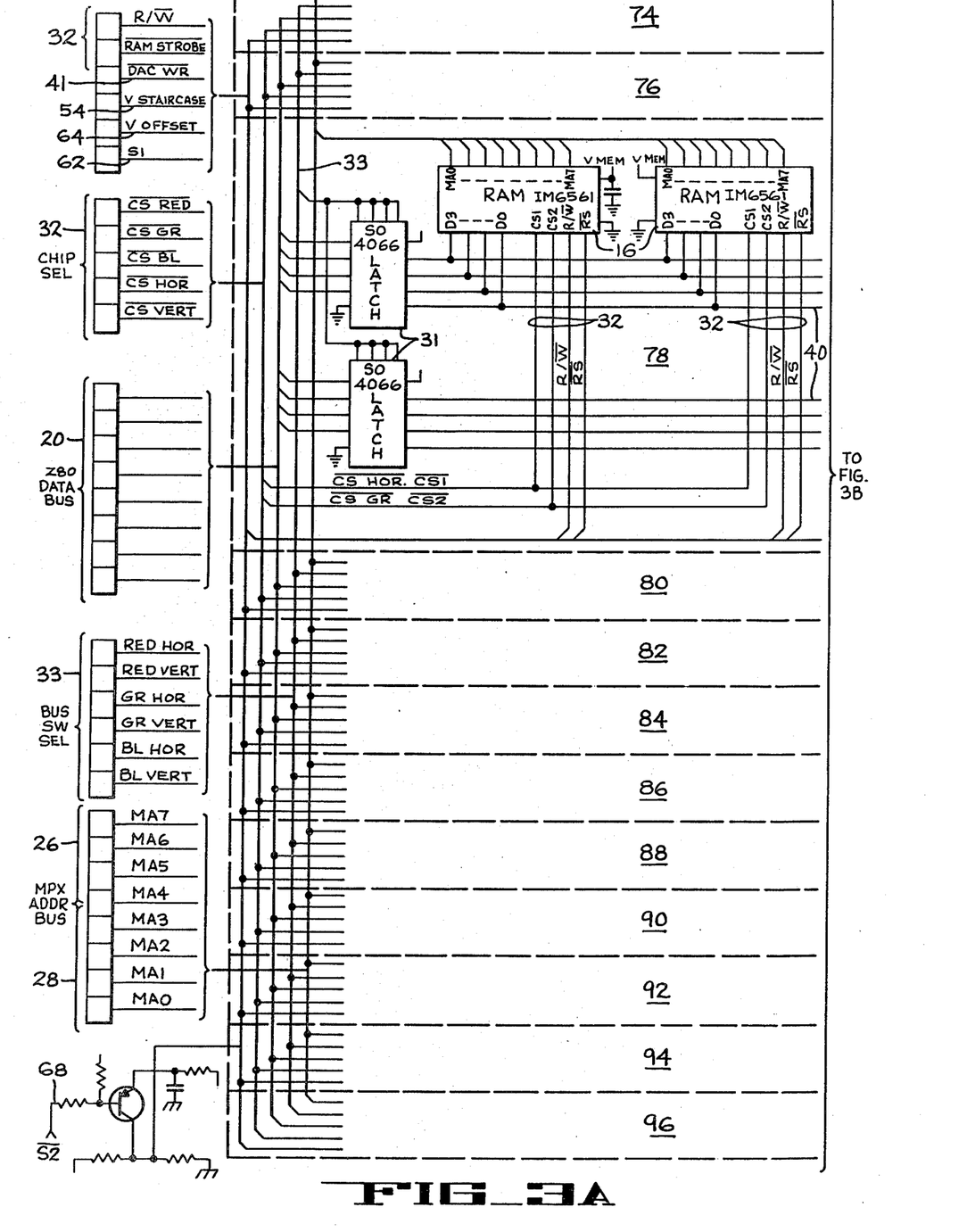
FIGS. 3A,B is a schematic diagram depicting implementations of the horizontal and vertical interpolators.
Figure 3B:
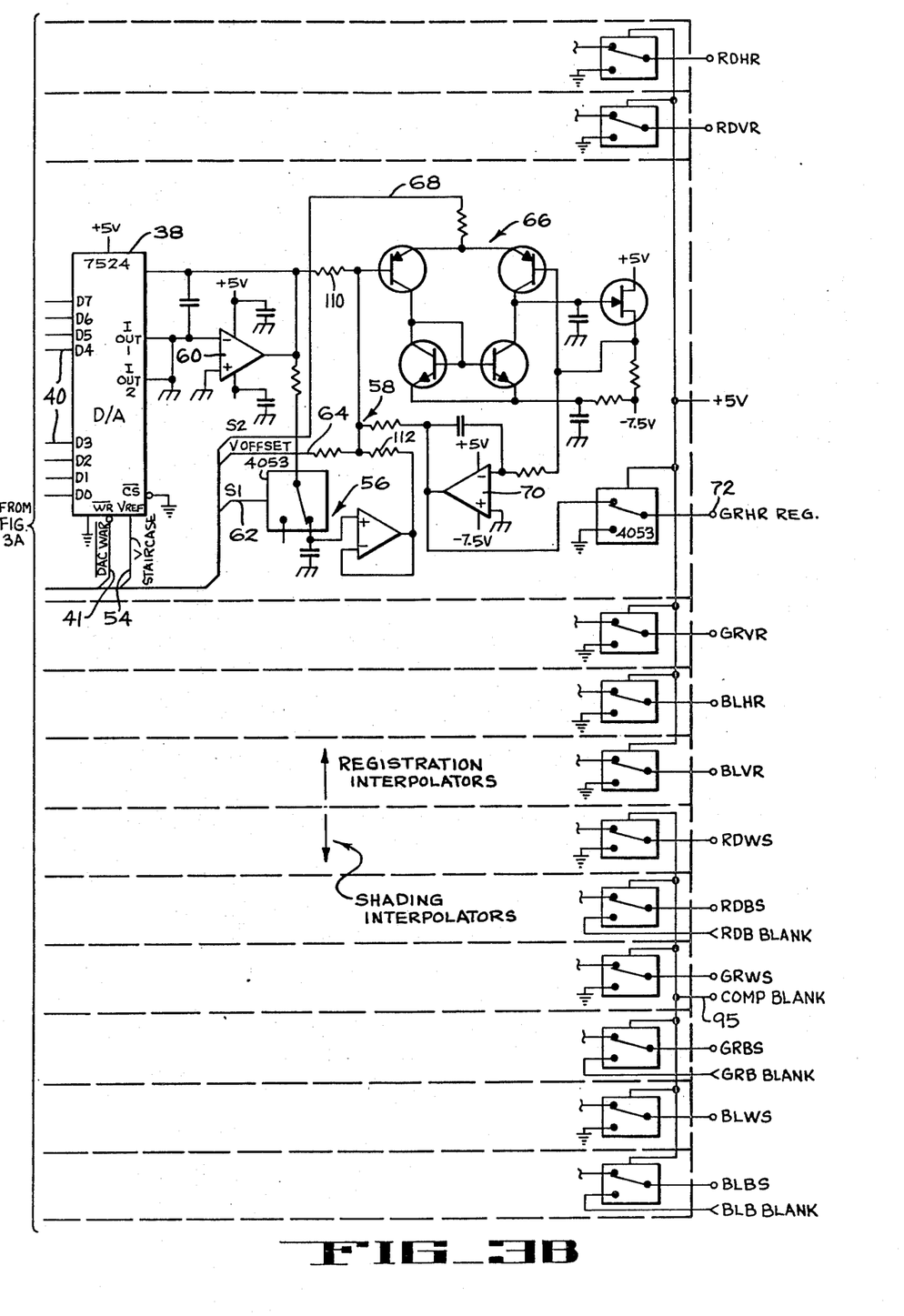

Referring now to FIGS. 3A, 3B, the interpolator 10 of FIG. 1 is shown in schematic, wherein like components are similarly numbered. As may be seen, the block diagram of FIG. 1 represents twelve similar interpolation circuits, viz, the red, green and blue (R,G,B) interpolator circuits for the correction of registration, i.e., spatial errors in the vertical (V) and horizontal (H) dimensions of a television picture, and the RGB interpolator circuits for the correction of black and white shading errors. The interpolator circuit 10 of FIG. 1 thus is formed of six identical registration interpolator circuits, viz, RH 74, RV 76, GH 78, GV 80, BH 82 and BV 84, and also six identical RGB white shading (WS) and black shading (BS) interpolator circuits, viz, RWS 86, RBS 88, GWS 90, GBS 92, BWS 94 and BBS 96, as depicting by dashed blocks in FIGS. 3A, 3B. Since the twelve circuits are identical for all twelve channels with the only difference being the respective channel input data and output correction signals, only the green (master) horizontal spatial error interpolator circuit 78 is specifically described herein, to simplify the presentation. The composite blanking on line 95 to the shading interpolator circuits (FIG. 3B) provides reference level for the black clamping circuitry in later video processing.

Thus, during a prior setup mode the spatial and shading errors are measured as in the copending K. H. Grisshaber application of previous mention, using a 16 by 16 matrix of measurement blocks (13 by 14 in the active picture area). Subsequently, when in the camera operating mode, and referring to FIGS. 3A, 3B, the data bus 20 from the microprocessor control system 18 is fed to the RAM 16 of the green horizontal (GH) channel via the data latch 31, in response to a GH command on the respective line of the lines 33 thereto. The RAM 16 is loaded in response to the write enable and RAM strobe signals, and chip select (CS-1, CS-2) commands, on the respective control lines 32. The error data is stored as 8 bit words in the respective RAM chips, and corresponds to correction data for one field, for one tube, i.e., the green tube in the GH channel circuit 78. Each channel of the twelve channels thus stores 256 bytes of 8 bit words, of registration and shading correction data.

Thus, subsequently, as when in the camera operating mode, the V interpolator portion (12 of FIG. 1) is provided with two sets of words in the respective RAM 16. The two sets correspond to the measured error correction data indicative of H spatial errors in the picture, and which corresponds to the stored correction data from a correction matrix row that is above the line presently being corrected, and the correction matrix row that is below the line being corrected. FIG. 2 depicts the line and row matrix, wherein there are 17 scan lines between successive rows of correction data points. As may be seen, an array of 16 by 16 correction data points are stored, however only 13 by 14 are within the active video picture, and thus are actually used. The words from the two sets of data are interleaved whereby the first word of the lower row follows the first word of the upper row, then the second word of the upper row follows the first word of the lower row, the second word of the lower row follows the second word of the upper row, the third word of the upper row follows the second word lower row, the third lower follows the third upper, and so on through all upper and lower words along a line of video being scanned. The interleaving process is provided in the interface circuit 24 of FIGS. 4A, 4B, via the timing generator/circuit 30, i.e., H and V address generating counters 98, 100 respectively and a latch 102. Thus the two sets of data are retrieved from the RAM 16 along with the H and V addresses via the multiplexed address bus 26, 28. The V address from the V counter 100 is fed to the adder 34, which adds a "1" or "0" to the V address. If adder 34 adds a "0" the V address corresponds to data from an upper row (i.e., the row above the line being scanned), and if it adds a "1" the V address corresponds to data from a lower row (a row below the line). For example, when scanning a line between rows 5 and 6, if the adder 34 adds a "0" to the V address, the data output is the data corresponding to row 5. If a "1" is added to the V address, the data output is from row 6. The adder 34 is clocked at the upper/lower clock rate of 250 KHZ, and thus alternately adds "0" for 2 µs, and "1" for 2 µs, for a total period of 4 µs.

The H and V addresses are loaded through an address multiplexer 104 which is dedicated to the address buses 26, 28 as long as the microprocessor control 18 is not reading or writing into the RAM 16. The H and V addresses generated commensurate with the data correction points, are fed via the multiplexed address buses 26, 28 respectively, to the address ports of the respective RAM 16 of the twelve (six spatial and six shading) interpolator circuits 74-96. The H address on bus 28 clocks at the H line rate, while the V address on bus 26 clocks at the 17 line rate, i.e., every 17 scan lines. The H and V addresses thus provide twelve different sets of data sequences via respective RAMs 16.

The data thus is accessed in the interleaved fashion of previous mention in each RAM 16; i.e. the adder 34 address alternately accesses data from the upper and lower rows of data in the RAMs. The interleaved data is strobed into the D/A converter 38. The data is read out via chip selects CSI and CS2, which simultaneously go low at the 500 KHZ rate at all RAMs 16. Thus every 2 µs another word appears at the RAM output, corresponding to every 2 µs that the adder 34 alternates from the upper, lower, upper, etc., address. Every 2 µs of data is also strobed into the internally latched D/A converter 38.

The converter 38 also receives the V staircase voltage via the line 54 from the ramp generator circuitry 42 of the interface circuit 24, performs the D/A conversion and multiplies the resulting analog signal times the V staircase to provide an analog output signal which is the product of that data word and the staircase.

The staircase voltage waveform consists of an interleaved pair of voltage levels whose value corresponds to the position of the line being corrected relative to the correction rows above and below the line. That is, the staircase voltage provides a weight factor corresponding to the line (L) position between the rows, as shown by the following table.

| lines/frame | 525(NTSC) | 625(PAL) |
|---|---|---|
| V upper | 2.5[(17-L)/17] | 2.5[(20-L)/20] |
| V lower | 2.5(L/17) | 2.5(L/20) |
| lines/row | 17 | 20 |

Note that the voltages (weights) of V upper plus V lower sum to 2.5 volts exactly. Thus the pair of analog weights change in value in inverse relation, as the lines are scanned from zero line to sixteen lines between two rows of correction points. To exemplify, given rows 3 and 4, the weight that corresponds to "upper" row 3, starts at 2.5 volts when scanning the first scan line below row 3, and decreases to zero volts in the course of scanning through the 17 lines below row 3. The weight corresponding to "lower" row 4, starts at zero volts with the first scan line below row 3 and increases to 2.5 volts in the course of scanning through the 17 scan lines. Thus, for example, the weight of upper row 3 is slightly less, and the weight of lower row 4 is slightly more, when scan line 3 below row 3 is scanned, than when scan line 2 below row 3 is scanned. In effect, the multiplication and subsequent addition, performs an interpolation between the data at rows 3 and 4.

The voltage staircase is generated as 17 voltage steps with one step per television line. Therefore, the raster scan in the vertical direction is discrete and the product output is also stepped through 17 levels. The staircase is generated via the ramp generator 42, which in FIG. 4B includes a counter 106 and a D/A converter 108. The latter feeds the inverter 48 and the summing junction 50, where the offset voltage of 2.5 volts is added via the line 52 to the junction 50. The resulting V-upper weight is fed to the commutating switch 46. The output of the D/A converter 108 also is coupled directly to the switch 46 as the V lower weight. Since the D/A 108 writes at the line rate the weights thus are constant for an entire line, and step to the next respective lower and higher voltage of the staircase at the beginning of the next line. The switch 46 also toggles at the same rate as does the adder 34, i.e., at 250 KHZ. Therefore, when the upper row data are presented to the D/A converter 38, the V upper staircase weight is also presented to the multiplying D/A 38, and are multiplied thereby. Likewise, the lower row data are presented to the D/A 38 with the V lower staircase weight, and are multiplied. Thus the output of the D/A converter 38 also is an interleaved sequence of voltages corresponding to the product of the commutated voltage waveform, and the prior interleaved sequence of data as illustrated by the following sequence. (V upper)×(word 1 upper), (V lower)×(word 1 lower), (V upper)×(word 2 upper), (V lower)×(word 2 lower), etc. The sequence appears at the D/A 38 output, i.e., the output of the amplifier 60.

Next, the V upper and V lower terms of the sequence are added together at the summing junction 58. To this end, the sample/hold 56 successively tracks and holds the V upper terms in the sequence, such that when the respective V lower terms arrive at the summing junction 58, the terms are added together. Thus, the V upper terms are stripped, delayed 2 $\mu$s, and the addition is performed every 4 $\mu$s to provide the following sequence. (V upper)×(word 1 upper)+(V lower)×(word 1 lower), (V upper)×(word 2 upper)+(V lower)×(word 2 lower), etc.

This sequence consists of the weighted sum of the correction row above, and the correction row below, the line being scanned and corrected. The values of the weights (corresponding to the upper and lower voltages) are determined by the position of the line being corrected between the upper and lower correction rows. The rules by which the values of these weights are produced, insure that the sequence between the correction rows vary linearly from one correction row to the next. This final sequence is presented from the section 14, in each of the twelve interpolator circuits 74–96.

At the instant that the summing is done at junction 58, the state of sample-2 on line 68 goes high to provide emitter current to the operational amplifier 66. The latter is a very fast sample-and-hold operational amplifier, which acquires the signal at its input in less than 250 nanoseconds (ns), which is the width of the pulse 52, and holds it for the required 4 $\mu$s to provide the input signal to the output integrator 70. The integrator 70 has a precise time constant equal to the correction interval, i.e., 4 $\mu$s, and integrates the incoming signal to provide the video correction signal at the interpolator circuit output 72. The correction signal is fed back to the summing junction 58, to provide a feedback signal.

Thus the summing junction 58 output is the difference between where the signal level should be after 4 $\mu$s, and where it is at present. It is this difference signal that is applied to the integrator 70. It is sampled at operational amplifier 66, is integrated via integrator 70, and moves the output at 72 to the value it should be after 4 $\mu$s.

Various resistors in the circuit should be matched; i.e., resistors 110 and 112 should be matched to 0.1% to prevent a sawtooth component from being added to the output correction signal.

Figure 4A:
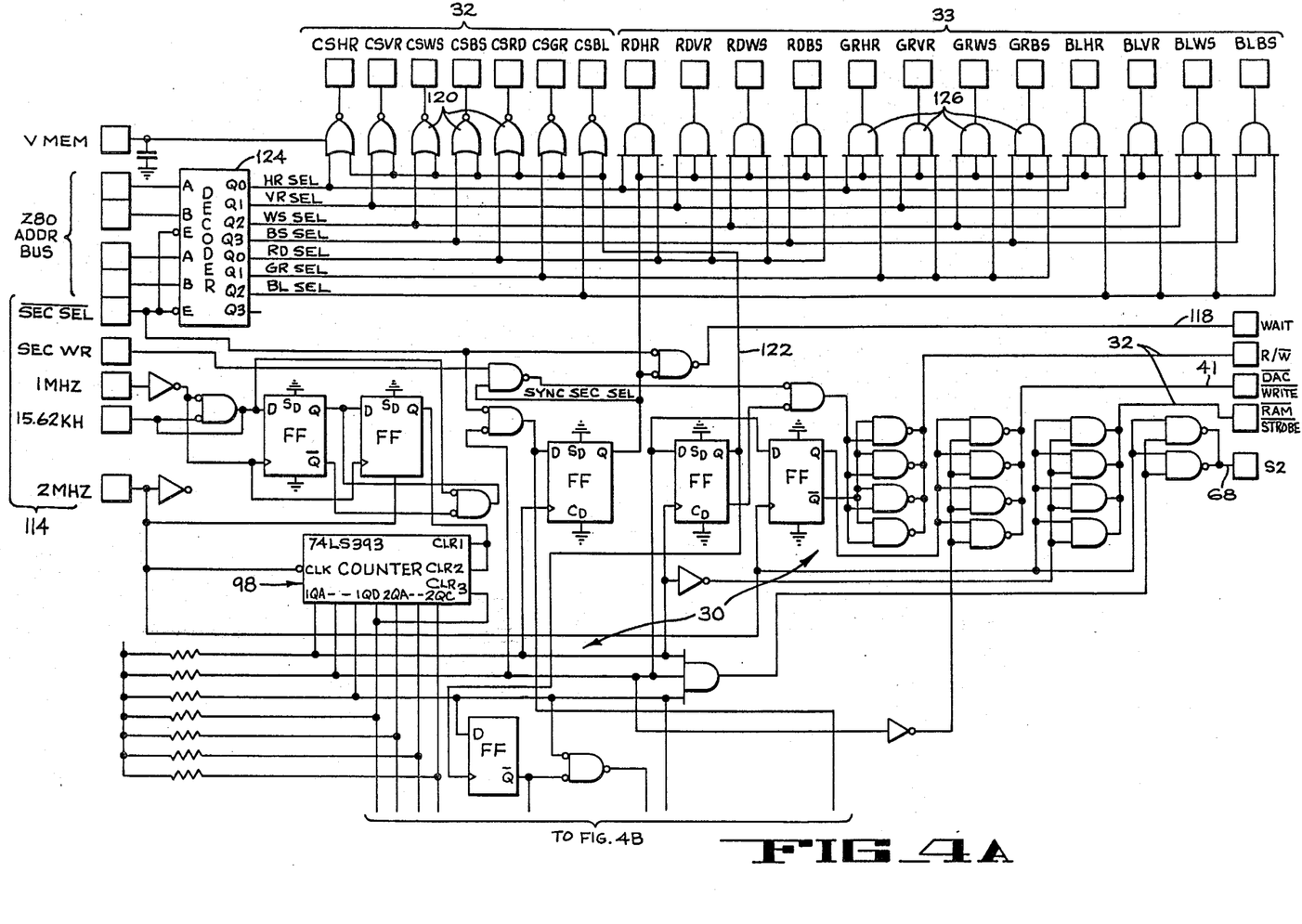
FIGS. 4A,B is a schematic diagram depicting a control/interface circuit for the interpolator circuit of FIGS. 3A,B.
Figure 4B:
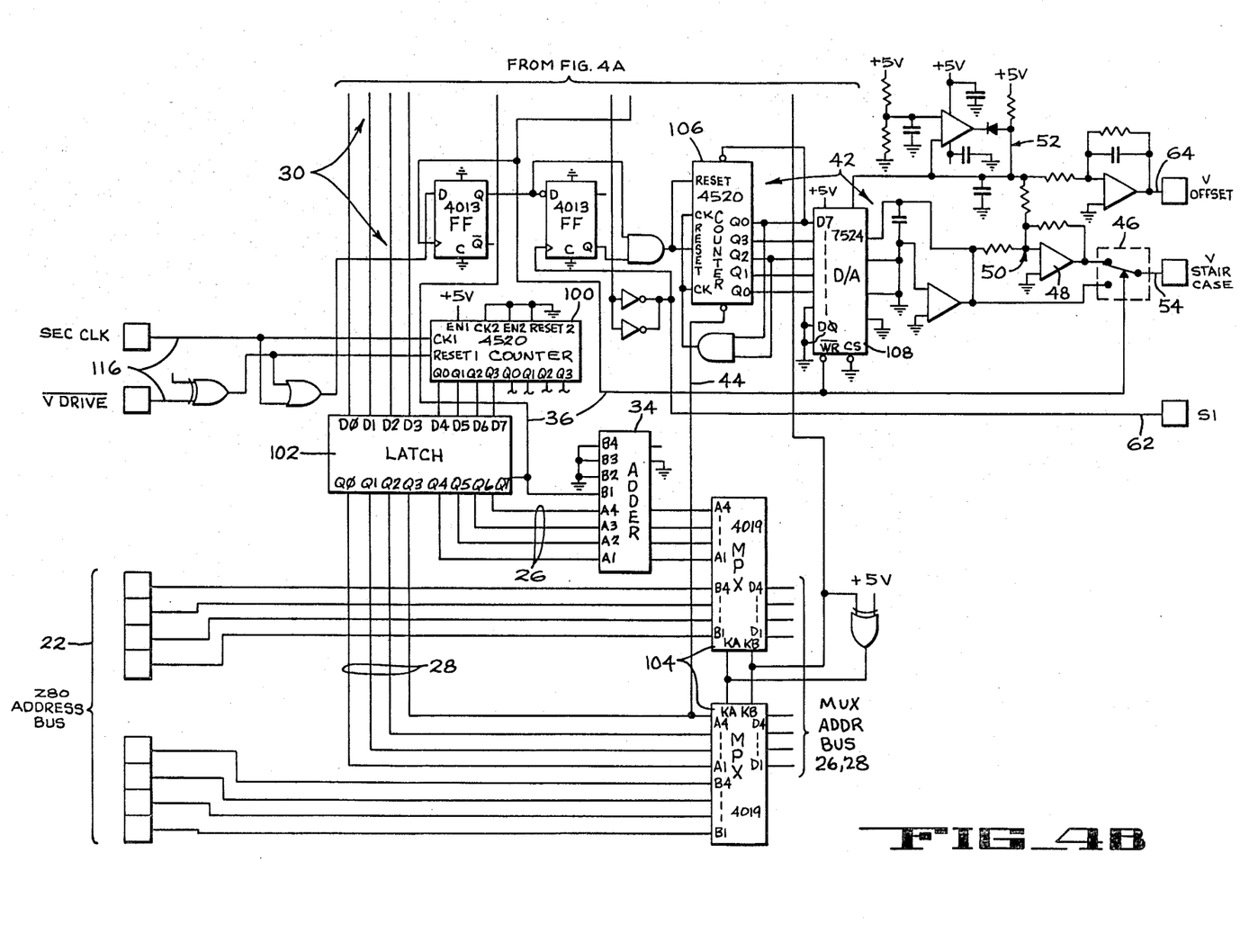

The timing generator/circuit 30 is provided with the various sync, reset, etc., clocks from the camera system labeled SEC write, 1 MHZ, 15.62 KHZ, 2 MHZ, SEC clock and V drive on lines 114 and 116 of FIGS. 4A, 4B, whereby the various component controls are provided and the SEC addresses are generated in sync with the camera raster scan. The circuit 30 thus provides a read/write low on the lines 32, which is normally high, when a RAM performs the write function. The output DAC write on line 41 is the signal that latches the data input to the latching D/A converter 38, whereby changing data at the RAM output is ignored by the D/A 38 until latching is desired as, for example, when the data stabilize. RAM strobe on lines 32 is required in the RAM used, to determine the duty cycle. S2 on line 68 is the sample signal for the first order sample-and-hold 66, i.e., the horizontal interpolator. S1 on line 62 is the sample signal that samples the V upper terms from the D/A converter 38 output sequence. The wait signal on a line 118 is a signal fed to the microprocessor control 18. The RAMs in the interpolator circuit may be written into, or read from, directly by the microprocessor control 18, at given times. But the microprocessor runs a 2 MHZ signal which can be out of phase. Thus the wait signal on line 118 provides direct memory access in the proper phase.

The chip select, CS, signals are provided on the control lines 32 via NOR gates 120, and provide means for selecting a specific RAM of the twelve channels, which is to be accessed by the microprocessor control 18. A signal on the second inputs to the NOR gates 120 termed "500 KHZ delayed by 1 MHZ" also is provided on a line 122 which, in its high state, provides a low on all chip selects, which turns all twelve of the RAMs on to read all into the respective vertical interpolator sections. A decoder 124 provides the inputs from the microprocessor control 18 to the gates 120.

A series of AND gates 126 provide means for controlling respective data bus latches 31 in each of the twelve interpolator circuits 74–96, via the lines 33 thereto. The latches 31 are coupled in pairs and allow the read or write function via a respective control line, when the logic state from the AND gates 126 go high. The decoder 124 again decodes the address of the memories in keeping with the chip select signals on lines 32.

What is claimed is:

1. A circuit for interpolating between values taken from two spaced rows of data points to define an interpolated output, comprising;

means for providing a selected stream of two sets of upper and lower data words corresponding to data from respective upper and lower rows of points disposed above and below a line therebetween;

multiplying means including a D/A converter for generating a selected sequence of product voltages by multiplying a selected data word of a row with a voltage indicative of the position of the line between the rows, wherein the sequence of product voltages define an interleaved sequence of the upper and lower data words and two voltage levels;

summing means for adding given voltages in the product voltage sequence to provide a final sequence of vertically interpolated voltages;

said summing means including a sample/hold circuit coupled to the multiplying means to delay selected ones of the product voltages, a junction for receiving the undelayed and delayed sequence of product voltages, a negative waveform of the interpolated output, and a DC offset voltage;

said summing means generating a difference voltage indicative of what the instantaneous value of the interpolated output should be; and means for horizontally interpolating between the final sequence of voltages to define the interpolated output.

2. A circuit for interpolating between values taken from two spaced rows of data points to define an interpolated output, comprising;

means for providing an upper set of data words corresponding to data points along a row above a line therebetween, and a lower set of data words interleaved in time with the upper set and corresponding to data points along a row below the line;

multiplying D/A converter means for alternately multiplying upper and lower data words with respective voltages indicative of the position of the line between the rows to provide a corresponding interleaved sequence of product voltages;

summing means for selectively combining the product voltage sequence to provide a final interleaved sequence of vertically interpolated voltages; and means for horizontally interpolating between the final interleaved sequence of voltages to define the interpolated output.

3. The circuit of claim 2 further including;

means for generating the respective voltages indicative of position as an alternately interleaved sequence of two voltage levels in sync with respective upper and lower data words; and the multiplying D/A converter means includes a single multiplying D/A converter for generating the selected interleaved sequence of the product voltages formed of the upper and lower data words and the two voltage levels.

4. The circuit of claim 3 wherein;

the summing means includes a sample/hold circuit coupled to the single multiplying D/A converter to delay product voltages corresponding to one row relative to those of the other row prior to the combining thereof.

5. The circuit of claim 4 wherein;

the summing means includes a junction for receiving the undelayed and delayed sequence of product voltages, a negative waveform of the interpolated output, and a D.C. offset voltage;

said summing junction generating a difference voltage indicative of what the instantaneous value of the interpolated output should be.

6. The circuit of claim 5 or 1 further including;

integrating means operatively coupled to the summing junction and having a precise time constant equal to the time between data points in the rows.

7. The circuit of claim 6 further including;

memory means for selectively storing the data words;

said multiplying D/A converter being coupled to the memory means to selectively retrieve the stream of data words.

8. The circuit of claim 7 further including;

address means associated with the memory means for selectively addressing the data word stream as alternate upper and lower rows of data points, respectively.

9. The circuit of claim 8 wherein;

the output of the multiplying D/A converter is represented by the sequence, (V upper)×(word 2 upper), (V lower)×(word 2 lower), etc, where V represents the voltages indicative of the line position.

10. The circuit of claim 9 wherein;

at the summing junction the final sequence is represented by, (V upper)×(word 1 upper)+(V lower)×(word 1 lower), (V upper)×(word 2 upper)+(V lower)×(word 2 lower), etc.

11. The circuit of claim 4 further including;

interface means, which include the means for generating the position voltages, for supplying timing and clocking signals commensurate with the respective interleaving sequences to the means for providing and to the D/A converter means.

12. The circuit of claim 11 wherein the means for generating the position voltage include;

a ramp generator for generating descending and ascending voltage ramps; and switch means coupled to the ramp generator to alternately supply to the multiplying D/A converter descending and ascending position voltages corresponding to the occurrence of the upper and lower data words.

13. The circuit of claim 11 wherein the means for providing the upper and lower set of data words include a single random access memory responsive to the interface means.

14. The circuit of claim 4 wherein the summing means further include;

capacitor means for storing the values of the delayed product voltages; and a summing junction coupled to the multiplying D/A converter and to the capacitor means for adding the undelayed product voltages to the delayed product voltages of the corresponding upper and lower data points.

15. The circuit of claim 14 wherein the means for horizontally interpolating include;

means coupled to the summing junction for sampling and holding the vertically interpolated voltages therefrom for a time interval corresponding to the occurrence of a data point; and integrating means coupled to the prior means and having a time constant equal to said time interval.

16. A circuit for generating an interpolation output by horizontally and vertically interpolating along a line between rows of data points of a two-dimensional array, comprising:

memory means for providing in response to respective addresses a selected stream of data words commensurate with the rows of data points;

address means for selectively addressing the memory means to generate the stream of data words;

ramp generating means for supplying weighted voltages in sync with the stream of data words which are indicative of the position between the rows of the line along which interpolation is performed;

multiplier means including a multiplying D/A converter for receiving the data words and the weighted voltages, for latching a data word and multiplying same by the respective weighted voltage to define a sequence of analog product voltages;

summing means coupled to the D/A converter for adding selected product voltages to define a final sequence of weighted voltages;

said summing means including a sample/hold circuit for delaying selected product voltages, a summing junction coupled to the sample/hold circuit for receiving the delayed and undelayed product voltages and for providing a difference voltage indicative of what the value of the interpolated output should be, a negative waveform of the interpolated output, and a selected DC offset voltage; and means coupled to the summing means for ramping the weighted voltages from the value that they are to a value they should be, to define the interpolated output.

17. A circuit for generating an interpolation output by horizontally and vertically interpolating along a line between rows of data points of a two dimensional array, comprising;

a single random access memory for providing in response to respective addresses a selected stream of interleaved data words representing alternate data values from upper and lower rows of data points;

ramp generating means for supplying alternately interleaved weighted voltages indicative of the position between two rows of the line along which interpolation is taking place;

a single multiplying D/A converter coupled to the single random access memory for receiving the stream of interleaved data words and the weighted voltages and for generating an interleaved sequence of analog product voltages;

summing means coupled to the multiplying D/A converter for adding a pair of alternate product voltages to define a final sequence of weighted voltages; and means coupled to the summing means for ramping the weighted voltages from a value where they are to a value where they should be, to define the interpolated output.

18. The circuit of claim 17 as employed in an error correction system for correcting spatial and shading errors in the tubes of a multi-channel camera, the system further including;

a plurality of interpolation circuits respectively disposed in the channels one for each error to be corrected; and control means coupled to the interpolation circuits of each channel to select the tube and the circuit corresponding to the error being corrected, and for supplying the correction interpolated output to the respective tube.

19. The circuit of claim 17 further including;

address means for selectively addressing the single random access memory to retrieve therefrom alternate data words of the interleaved data words during a selected time interval; and wherein the weighted voltages corresponding to upper and lower rows are supplied in sync with the stream of respective upper and lower data words.

20. The circuit of claim 19 wherein;

the single multiplying D/A converter latches each successive data word and multiplies same by the respective upper and lower weighted voltage to supply an interleaved sequence of analog product voltages.

21. The circuit of claim 20 wherein the summing means includes;

a sample/hold circuit for delaying selected ones of the product voltages;

a summing junction coupled to the sample/hold circuit for receiving the delayed and undelayed sequences of product voltages, a negative waveform of the interpolated output, and a selected DC offset voltage; and said summing junction providing a difference voltage indicative of what the value of the interpolated output should be.

22. The circuit of claim 21 or 16 wherein the means for ramping coupled to the summing means includes, a sampling means, and an integrating means coupled to the sampling means for ramping the interpolated output to a value corresponding to the difference voltage applied thereto.

23. The circuit of claim 22 further including;

an interface circuit which includes the generating means, and which further includes;

timing generator/circuit means for generating selected timing and clocking signals for the circuit components; and adder/multiplexer means integral with the address means for generating addresses which distinguish the upper and lower data words of the rows of data points.

* * * * *